(12) United States Patent
Kono et al.

(10) Patent No.: US 8,488,344 B2
(45) Date of Patent: Jul. 16, 2013

(54) ELECTRICAL POWER CONVERSION APPARATUS INCLUDING A CONTROL MICROPROCESSOR FOR ELIMINATING OR CURBING A BEAT PHENOMENON

(75) Inventors: Masaki Kono, Tokyo (JP); Takahiko Kobayashi, Tokyo (JP); Keita Hatanaka, Tokyo (JP)

(73) Assignee: Mitsubishi Corporation, Chiyoda-Ku, Tokyo (JP)

( * ) Notice: Subject to any disclaimer, the term of this patent is extended or adjusted under 35 U.S.C. 154(b) by 259 days.

(21) Appl. No.: 12/864,821

(22) PCT Filed: Feb. 13, 2008

(86) PCT No.: PCT/JP2008/052323
§ 371 (c)(1),
(2), (4) Date: Jul. 27, 2010

(87) PCT Pub. No.: WO2009/101673
PCT Pub. Date: Aug. 20, 2009

(65) Prior Publication Data
US 2010/0308649 A1 Dec. 9, 2010

(51) Int. Cl.
*H02M 5/45* (2006.01)
(52) U.S. Cl.
USPC .............................................. 363/37; 363/97
(58) Field of Classification Search
USPC .......................................... 363/34, 37, 95, 97
See application file for complete search history.

(56) References Cited

U.S. PATENT DOCUMENTS 4,774,621 A * 9/1988 Andow ........................... 361/80
4,978,894 A * 12/1990 Takahara ....................... 318/768

(Continued)

FOREIGN PATENT DOCUMENTS

| CA | 2667044 A1 | 4/2008 |
|---|---|---|
| JP | 59-169383 A | 9/1984 |

(Continued)

OTHER PUBLICATIONS

International Search Report (PCT/ISA/210) issued on May 20, 2008 by the Japanese Patent Office as the International Searching Authority for International Application No. PCT/JP2008/052323.

(Continued)

*Primary Examiner* — Adolf Berhane
*Assistant Examiner* — Lakaisha Jackson
(74) *Attorney, Agent, or Firm* — Buchanan Ingersoll & Rooney PC

(57) ABSTRACT

In a conventional electrical power conversion apparatus, a control microprocessor performs a control for eliminating or curbing a beat phenomenon, so that a control delay occurs because computing time is required in the control microprocessor. Because of the control delay, it is not possible to obtain an effect of sufficiently reducing a current ripple and torque pulsation. In addition, in an electric train in which a frequency of an AC power source is changed over while the train is running, it is required for a method of detecting a ripple component by a band-pass filter that a plurality of band-pass filters are provided and then the changeover is performed depending on the power source frequency, resulting in difficulties to take countermeasures. An electrical power conversion apparatus according to the present invention stores DC voltage values at predetermined sampling time-points going back from the latest, and predicts a DC voltage estimate value for a predetermined elapse time from the latest sampling time-point using the stored DC voltage values, whereby using the predicted DC voltage estimate value, an amplitude and/or a frequency of AC power that an inverter outputs is controlled so as to curb variation of the AC power that the inverter outputs, due to a ripple caused on the DC side of the inverter.

5 Claims, 11 Drawing Sheets

U.S. PATENT DOCUMENTS

| | | | |
|---|---|---|---|
| 5,532,569 A * | 7/1996 | Tanamachi et al. | 318/802 |
| 5,959,430 A * | 9/1999 | Yuki et al. | 318/805 |
| 7,808,202 B2 * | 10/2010 | Tobari et al. | 318/801 |
| 7,869,232 B2 * | 1/2011 | Nagata et al. | 363/37 |
| 8,045,345 B2 | 10/2011 | Kono | |
| 8,279,641 B2 * | 10/2012 | Kawamoto et al. | 363/37 |
| 8,305,786 B2 * | 11/2012 | Kawasaki | 363/95 |
| 2010/0128502 A1 * | 5/2010 | Kawamoto et al. | 363/34 |
| 2011/0316490 A1 * | 12/2011 | Lang et al. | 322/21 |

FOREIGN PATENT DOCUMENTS

| | | | |
|---|---|---|---|
| JP | 64-077492 A | | 3/1989 |
| JP | 7-046918 A | | 2/1995 |
| JP | 7-46918 B2 | | 5/1995 |
| JP | 2002-272129 A | | 9/2002 |
| JP | 2003-299387 | * | 10/2003 |
| JP | 2003-299387 A | | 10/2003 |
| JP | 2004-147433 A | | 5/2004 |
| JP | 2007-228659 | * | 6/2007 |
| JP | 2007-228659 A | | 9/2007 |

OTHER PUBLICATIONS

Office Action (Notice of Preliminary Rejection) dated Nov. 11, 2011, issued in the corresponding Korean Patent application No. 10-2010-7014341, and an English Translation thereof.

Office Action (Examiner's First Report on Patent) dated Feb. 2, 2012, issued in the corresponding Australian Patent Application No. 2008350481. (2 pages).

International Preliminary Report on Patentability and the Written Opinion of the International Searching Authority (Form PCT/IB/373 and PCT/ISA/237) dated Sep. 7, 2010, issued in the corresponding International Application No. PCT/JP2008/052323. (6 pages).

Office Action from Canadian Intellectual Property Office dated Nov. 14, 2012, issued in corresponding Canadian Patent Application No. 2,714,211.

* cited by examiner

ELECTRICAL POWER CONVERSION APPARATUS INCLUDING A CONTROL MICROPROCESSOR FOR ELIMINATING OR CURBING A BEAT PHENOMENON

TECHNICAL FIELD

The present invention relates to an electrical power conversion apparatus that converts DC power into variable frequency and/or variable voltage AC power, in particular to an electrical power conversion apparatus that includes a converter and an inverter into which a DC voltage outputted from the converter is inputted so as to be converted into variable frequency and/or variable AC voltages.

BACKGROUND ART

In a conventional electrical power conversion apparatus for an electric railroad car, a converter is connected to a single-phase AC power source between a power line and a rail/rails as the AC-side input by way of a pantograph and a transformer, or the like, and performs an AC-to-DC conversion so as to obtain a predetermined DC voltage. A capacitor is provided on the DC side of the converter for smoothing its voltage. DC power stored in the capacitor is converted into variable frequency and/or variable voltage AC power by the inverter. An AC rotating machine such as an induction motor is driven by the AC power that the inverter outputs. In addition, the voltage of the capacitor, namely, a DC input voltage for the inverter is detected by a voltage detector. On the AC output side of the inverter, a current detector is provided.

The voltage of the capacitor pulsates at a two-fold frequency (the frequency is referred to as a "ripple frequency") of a frequency of the AC power source. It is known that, if no countermeasure is taken in a case in which a frequency (referred to as an "output frequency") of AC power that an inverter outputs is near to the ripple frequency, the AC power that the inverter outputs and, consequently, torque produced by a motor vary at a frequency of the difference between the ripple frequency and the output frequency. Such variation is referred to as a "beat phenomenon." The beat phenomenon occurs when a difference in power arises between a positive half-cycle and a negative half-cycle of the AC power because of the DC voltage that varies.

In order to eliminate or curb the beat phenomenon, a control is performed in which only a ripple component is extracted using a band-pass filter or the like from a DC input voltage for an inverter detected by a voltage detector, and, in one period of a ripple frequency, an output frequency of the inverter is varied in proportion to the magnitude of a ripple component. (For example, refer to Patent Document 1.)

[Patent Document 1]
Japanese Patent No. H07-46918 (FIG. 1, claim 1)

DISCLOSURE OF THE INVENTION

Problems to be Solved by the Invention

In a conventional electrical power conversion apparatus, a control microprocessor performs a control for eliminating or curbing a beat phenomenon. Therefore, a control delay occurs because computing time is required in the control microprocessor. There has been a case in which the control delay becomes larger depending on computing time of the control microprocessor, and a phase delay is brought about in a ripple frequency, so that it is not possible to obtain an effect of sufficiently reducing the current ripple and torque pulsation. For this reason, there arises a problem in that an inexpensive control microprocessor cannot be utilized.

For example, when the computing time of a control microprocessor is 500 microseconds, if a frequency of an AC power source is 50 Hz, a phase delay P [degree] in a ripple frequency is given by the following equation:

$$P = 500\ [\text{microsecond}] \times 2 \times 50\ [\text{Hz}] \times 360\ [\text{degree}] = 18.0\ [\text{degree}]$$

If the frequency of an AC power source is 60 Hz, the following equation is given:

$$P = 500\ [\text{microsecond}] \times 2 \times 60\ [\text{Hz}] \times 360\ [\text{degree}] = 21.6\ [\text{degree}]$$

It can be understood that the phase delay P in response to the same control delay differs depending on the AC power source frequencies. It can be understood that the larger the computing time of a control microprocessor, the larger the phase delay. For this reason, the computing time becomes larger with such an inexpensive control microprocessor, so that the phase delay becomes larger, resulting in lowering the effect of reducing the current ripple and torque pulsation.

Moreover, in an electric train in which a frequency of an AC power source is changed over (for example, between 50 Hz and 60 Hz) while the train is running, there arises a problem in a method of detecting a ripple component by a band-pass filter, requiring that a plurality of band-pass filters are provided and then a changeover is performed depending on the power source frequencies, so that it is difficult to take countermeasures.

The present invention has been directed at solving those conventional problems as described above, and an object of the invention is to provide an electrical power conversion apparatus that is capable of compensating delays existing in a detection mechanism and a control system without depending on a ripple frequency of DC voltage, and of curbing variation of AC power that is an output from the electrical power conversion apparatus.

Means for Solving the Problems

An electrical power conversion apparatus according to the present invention comprises a converter for converting AC power into DC power; a capacitor connected in parallel with the converter on the DC side thereof; a DC voltage measurement unit for measuring a voltage across the capacitor; an inverter connected in parallel with the capacitor, for converting DC power into AC power of an arbitrary frequency; and a control device into which DC voltage values each measured by the DC voltage measurement unit are inputted in a predetermined sampling period, for controlling the inverter, wherein the control device includes a voltage control unit for controlling a voltage amplitude of the AC power that the inverter outputs; a frequency control unit for controlling the frequency of the AC power that the inverter outputs; a DC voltage-value memory unit for storing DC voltage values at predetermined sampling time-points going back from the latest; a DC voltage-value estimation unit for predicting a DC voltage estimate value at a predetermined time after the latest sampling time-point using the DC voltage values stored in the DC voltage-value memory unit; and a beat suppression unit into which the DC voltage estimate value predicted by the DC voltage-value estimation unit is inputted, for operating on either one or both of the voltage control unit and the frequency control unit so as to curb variation of the AC power that the inverter outputs, due to a ripple caused on the DC side of the inverter.

Effects of the Invention

An electrical power conversion apparatus according to the present invention comprises a converter for converting AC power into DC power; a capacitor connected in parallel with the converter on the DC side thereof; a DC voltage measurement unit for measuring a voltage across the capacitor; an inverter connected in parallel with the capacitor, for converting DC power into AC power of an arbitrary frequency; and a control device into which DC voltage values each measured by the DC voltage measurement unit are inputted in a predetermined sampling period, for controlling the inverter, wherein the control device includes a voltage control unit for controlling a voltage amplitude of the AC power that the inverter outputs; a frequency control unit for controlling the frequency of the AC power that the inverter outputs; a DC voltage-value memory unit for storing DC voltage values at predetermined sampling time-points going back from the latest; a DC voltage-value estimation unit for predicting a DC voltage estimate value at a predetermined time after the latest sampling time-point using the DC voltage values stored in the DC voltage-value memory unit; and a beat suppression unit into which the DC voltage estimate value predicted by the DC voltage-value estimation unit is inputted, for operating on either one or both of the voltage control unit and the frequency control unit so as to curb variation of the AC power that the inverter outputs, due to a ripple caused on the DC side of the inverter, so that there exists an effect that it is possible to compensate delays existing in a detection mechanism and a control system without depending on a frequency of the ripple of DC voltage, and to curb variation of the AC power that is the output from the electrical power conversion apparatus.

BRIEF DESCRIPTION OF DRAWINGS

FIG. 5 (A) is a case in which the control by the present invention is performed, and FIG. 5 (B) is a case in which the control by the present invention is not performed;

EXPLANATION OF NUMERALS AND SYMBOLS

"1," converter; "2," capacitor;
"3," inverter; "4," AC rotating machine (induction machine);
"4A," AC rotating machine (synchronous machine); "5," control device;
"51," DC voltage-value memory unit; "52," DC voltage-value estimation unit;
"53," beat extraction unit; "54," angular frequency control-value calculation unit (beat suppression unit);
"55," frequency control unit; "55A," frequency control unit;
"56," voltage control unit; "56A," voltage control unit; "56B," voltage control unit; "56C," voltage control unit;
"57," pulse generating unit; "57A," pulse generating unit;
"58," power-modulation-factor calculation unit (beat suppression unit); "59," phase-voltage transformation unit (beat suppression unit);
"5A," reciprocal number transformation unit (beat suppression unit); "5B," angular frequency instruction-value setting unit;
"5C," output-voltage calculation unit; "6," voltage detection unit (DC voltage measurement unit);
"7," rotation sensor; "8," filter.

BEST MODE FOR CARRYING OUT THE INVENTION

Embodiment 1

Figure 1:
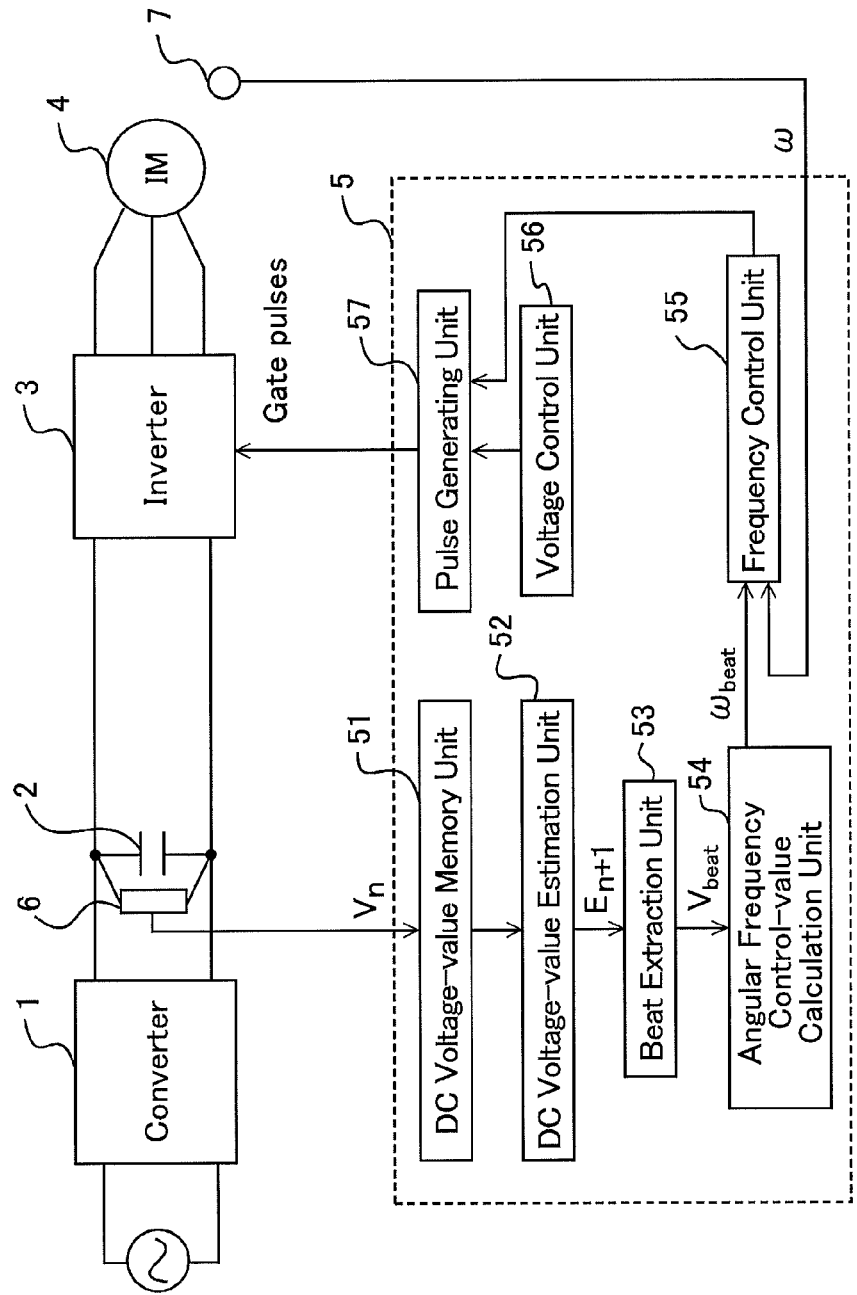
FIG. 1 is a block diagram illustrating a configuration example of an electrical power conversion apparatus according to Embodiment 1 of the present invention.

FIG. 1 is a block diagram illustrating a configuration example of an electrical power conversion apparatus according to Embodiment 1 of the present invention. In FIG. 1, the electrical power conversion apparatus includes a converter 1 for converting AC power from an AC power source into DC power by rectifying the AC power, a capacitor 2 connected in parallel with the converter 1 on the DC side thereof for smoothing a ripple due to the rectification, and an inverter 3 for converting the DC power stored in the capacitor 2 into AC power of an arbitrary frequency at arbitrary voltages. An induction machine that is an AC rotating machine 4 is connected to the inverter 3 on the AC side thereof. A control device 5 controls the inverter 3 so that the inverter 3 outputs voltage amplitudes and a frequency to be outputted, obtained from instruction values for torque to be outputted from the AC rotating machine 4, and for its rotation angular frequency. Note that, similar effects can be expected using either an induction machine or a synchronous machine for the AC rotating machine 4 driven by the electrical power conversion apparatus of the present invention.

Figure 2:
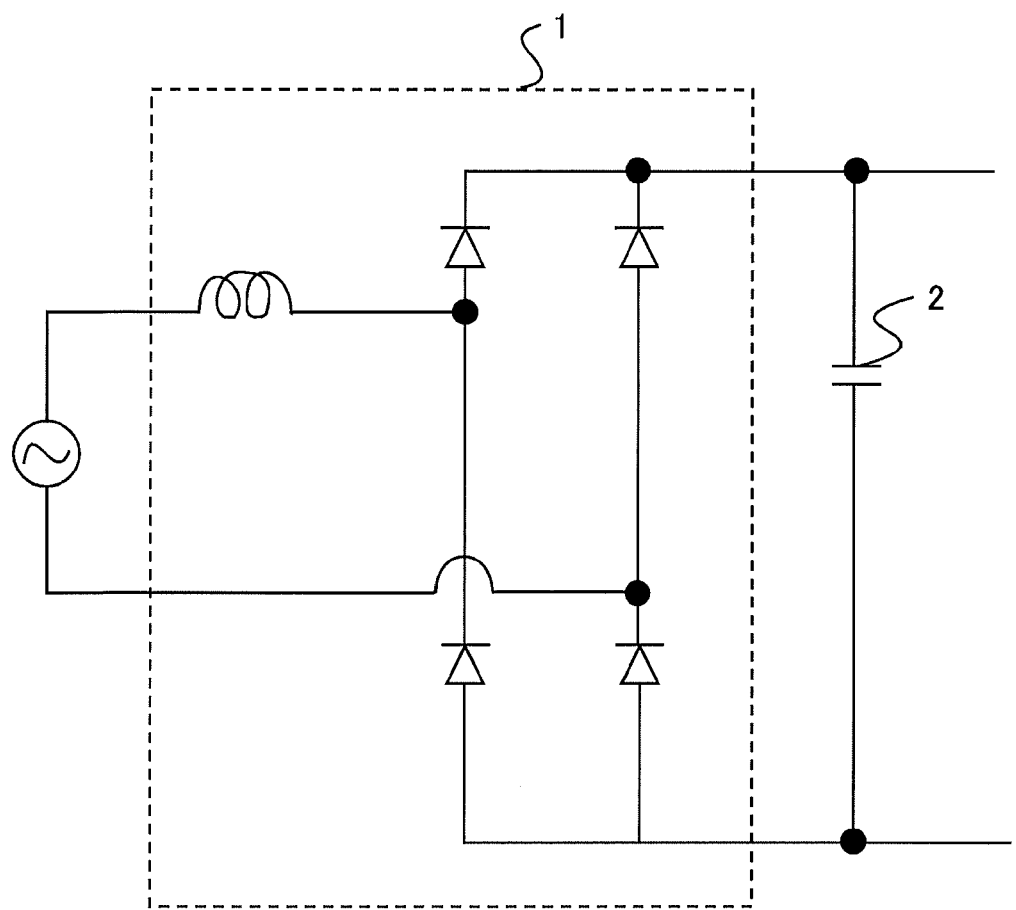
FIG. 2 is a diagram for explaining a configuration of a converter in the electrical power conversion apparatus according to Embodiment 1 of the present invention.

A diagram shown in FIG. 2 is for explaining a configuration of the converter 1. FIG. 2 indicates a single-phase diode rectifier circuit. A converter of a bridge circuit using switching elements such as IGBTs may also be utilized. Instead of the single phase, a power source of three-phase AC may also be utilized for the converter. As far as the converter can convert AC power from the AC power source into DC power, any kind of converter may be utilized.

The inverter 3 performs a pulse width modulation (PWM) operation, and outputs AC voltages derived by performing vector control to operate the AC rotating machine 4 so as to satisfy those instruction values for its secondary magnetic-flux, torque and a rotation angular frequency. Note that, the present invention is applicable to a case in which the vector control is not performed.

The control device 5 performs discrete time control, and is supplied in a predetermined sampling period with a DC voltage measurement value that is a voltage across the capacitor 2 measured by a voltage detection unit 6 that is a DC voltage measurement unit, and a rotation angular frequency measured by a rotation sensor 7. Control values determined based on the latest sampling value are used for the next sampling time-point.

The control device 5 includes a DC voltage-value memory unit 51 for storing voltage measurement values at predetermined sampling time-points (three points here) going back from the latest; a DC voltage-value estimation unit 52 for predicting a voltage across the capacitor 2 after a predetermined time (here, one sampling period) from the latest sampling time-point, using polynomial approximation based on the voltage measurement values at predetermined sampling time-points (three points here) going back from the latest; a beat extraction unit 53 into which DC voltage estimate values predicted by the DC voltage-value estimation unit 52 are successively inputted, for extracting a ripple component Vbeat; an angular frequency control-value calculation unit 54 that is a beat suppression unit, for outputting an angular frequency control-value wheat in which the ripple component Vbeat extracted by the beat extraction unit 53 is multiplied by a predetermined gain; a frequency control unit 55 into which the angular frequency control-value wheat is inputted, for controlling a frequency of output voltages of the inverter 3; a voltage control unit 56 for controlling the amplitudes of the output voltage of the inverter 3; and a pulse generating unit 57 into which signals from the frequency control unit 55 and the voltage control unit 56 are inputted, for outputting gate pulses to control switching elements that the inverter 3 includes.

Next, the operations will be explained. In the DC voltage-value estimation unit 52, a DC voltage value is predicted for a next sampling time-point by extrapolating a second-order approximation polynomial derived from DC voltage measurement values at three sampling time-points going back from the latest.

In order to derive the equation that predicts the DC voltage value at the next sampling time-point, the following variables are defined.

Figure 3:
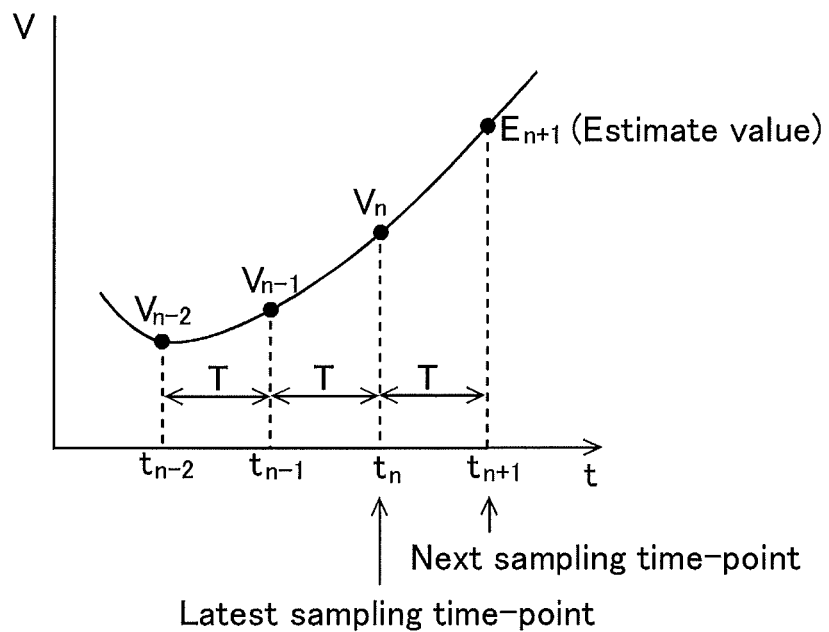
FIG. 3 is a diagram for explaining a concept of voltage estimation according to Embodiment 1 of the present invention.

T: a sampling period
$t_n$: the latest sampling time-point
$t_{n-m}$: a sampling time-point m-times before the latest ($=t_n-m \times T$)
$t_{n+1}$: a next sampling time-point to the latest
$V_n$: a voltage measurement value at the latest sampling time-point
$V_{n-m}$: a voltage measurement value at a sampling time-point m-times before the latest
$E_{n+1}$: a voltage estimate value for a next sampling time-point to the latest A diagram shown in FIG. 3 is for explaining a concept of voltage estimation according to Embodiment 1 of the present invention. Based on three voltage measurement values $V_n$, and $V_{n-1}$ and $V_{n-2}$ going back from the latest, the polynomial is obtained that expresses the voltages indicated by the solid-line curve as a function of time. By inputting time for a next sampling time-point into the obtained polynomial, a voltage estimate value $E_{n+1}$ is calculated for the next sampling time-point.

Here, regarding the variable $t_n$ as a reference to time, the second-order approximation polynomial for the DC voltage value is assumed as follows:

$$V_{n-m} = a \times (m \times T)^2 - b \times (m \times T) + c \quad (1)$$

By substituting the voltage measurement values at three sampling time-points going back from the latest into Equation (1), the following equations are given:

$$Vn = c \quad (2)$$

$$V_{n-1} = a \times T^2 - b \times T + c \quad (3)$$

$$V_{n-2} = 4 \times a \times T^2 - 2 \times b \times T + c \quad (4)$$

In addition, by calculating the voltage estimate value $E_{n+1}$ for the next sampling time-point from Equation (1), the following equation is given:

$$E_{n+1} = a \times T^2 + b \times T + c \quad (5)$$

By subtracting Equation (3) from Equation (5), the following equation is given:

$$E_{n+1} - V_{n-1} = 2 \times b \times T \quad (6)$$

By adding Equation (5) to Equation (3), the following equation is given:

$$E_{n+1} + V_{n-1} = 2 \times a \times T^2 + 2 \times c \quad (7)$$

Because the right-hand side of the equation in which the sum of Equation (6) and tripled Equation (2) are subtracted from doubled Equation (7), becomes equal to the right-hand side of Equation (4), the following equation is held:

$$V_{n-2} = 2 \times (E_{n+1} + V_{n-1}) - (E_{n+1} - V_{n-1}) - 3 \times V_n \quad (8)$$

By solving Equation (8) for $E_{n+1}$, the following equation is given:

$$E_{n+1} = 3 \times (V_n - V_{n-1}) + V_{n-2} \quad (9)$$

Equation (9) is an equation that calculates a voltage estimate value for a next sampling time-point by extrapolation using the second-order approximation polynomial derived from the voltage measurement values at three sampling time-points going back from the latest. Without calculating the coefficients a, b and c of the second-order approximation polynomial, it is possible to obtain by the simple calculation a voltage estimate value for a next sampling time-point based on the voltage measurement values at three sampling time-points going back from the latest, so that the calculation can be achieved with sufficient responsivity using a control microprocessor that is not very fast in computing power.

Figure 4:
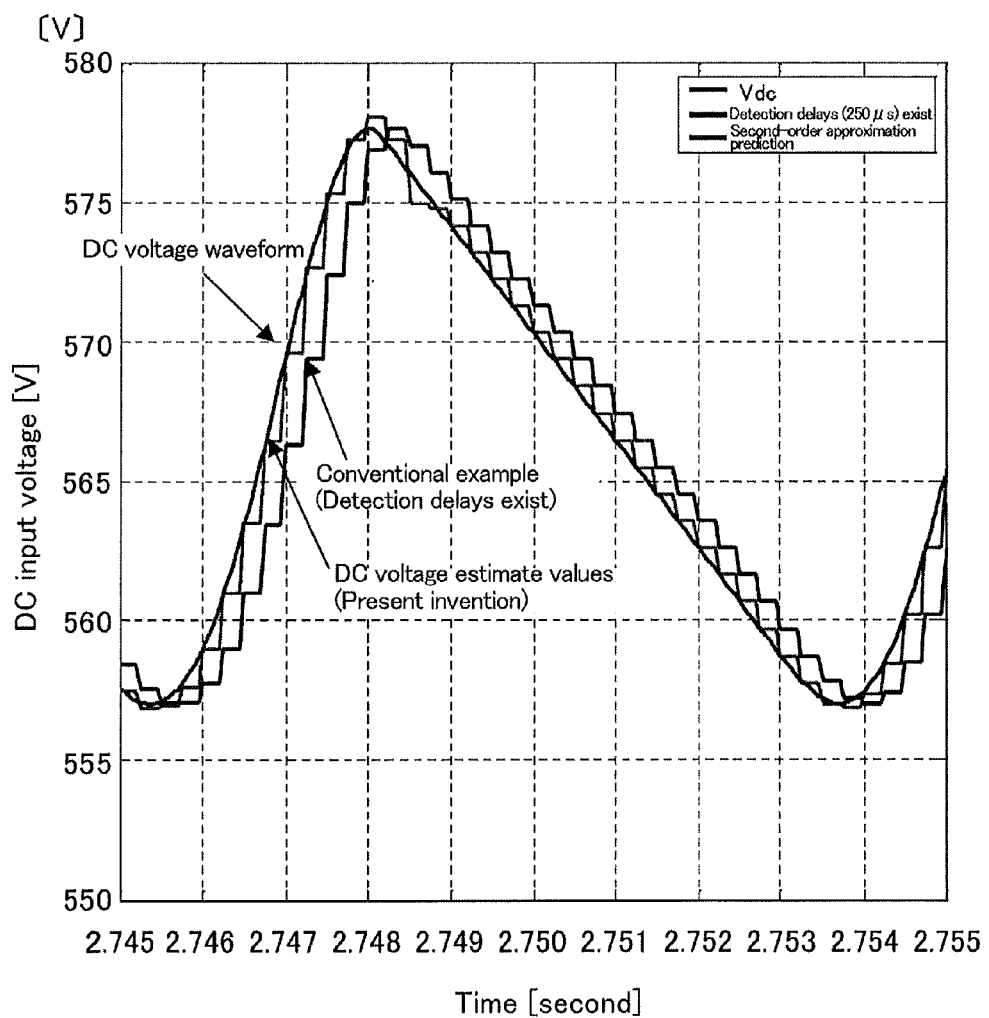
FIG. 4 is a diagram illustrating voltage estimate values that a DC voltage-value estimation unit predicts for a next sampling time-point, when a sampling period is set at 250 microseconds in the electrical power conversion apparatus according to Embodiment 1 of the present invention.

In FIG. 4, voltage estimate values each of which the DC voltage-value estimation unit 52 predicts for a next sampling time-point are illustrated when a sampling period "T" is set at 250 microseconds. The voltage estimate values for respective next sampling time-points are indicated by a solid line that changes in the staircase pattern for every "T" In addition, voltage measurement values each at the latest sampling time-points as drawn with a delay of one sampling period "T" are together indicated. DC voltage values obtained by second-order approximation polynomials that are different from each other for the respective time-intervals are indicated by the solid-line curve. It can be understood from the voltage estimate values for the respective next sampling time-points that the DC voltages can be approximately predicted in good accuracy. Note that, a predetermined calculation is performed in one sampling period, and the control is performed for every sampling period, so that the control will be delayed by one sampling period in a case in which the control for the predictive estimation is not performed for the next sampling time-point.

Note that, it is possible to adopt the approximation using a polynomial of third-order or higher. Although the details of derivation will be omitted, the following equation is used when a DC voltage value is predicted for a next sampling time-point by extrapolating a third-order approximation polynomial based on voltage measurement values at four sampling time-points going back from the latest.

$$E_{n+1} = 4 \times (V_n - V_{n-2}) - 6 \times V_{n-1} - V_{n-3} \quad (10)$$

Similarly, the following equation is given when a fourth-order approximation polynomial is used.

$$E_{n+1} = 5 \times (Vn - V_{n-3}) - 10 \times (V_{n-1} - V_{n-2}) + V_{n-4} \quad (11)$$

In the DC voltage estimation using polynomial approximation of Equation (9) through Equation (11), the minimum required number of measurement values of the DC voltage is used for determining the coefficients of the polynomial approximation. Because noise or the like is included in the measurement values of the DC voltage, in order to prevent an influence caused by such noise as much as possible in the voltage estimation, polynomial approximation may be obtained to be used for the estimation by increasing the number of measurement values of the DC voltage so as to minimize the square errors. In addition, a DC voltage may be predicted for a next sampling time-point using polynomial approximation that is derived with predetermined times of sampling periods (for example, two times) as a unit. For example, when such estimation using a second-order approximation polynomial is performed with two times of the sampling periods as a unit, the following equation is given:

$$E_{n+1} = (15/8) \times V_n - (5/4) \times V_{n-2} + (3/8) \times V_{n-4} \quad (12)$$

Moreover, the apparatus may be configured so that a DC voltage is predicted for a next sampling time-point based on measurement values of the DC voltage at the latest, one-period previous and three-period previous sampling time-points. The estimation may be performed using an approximate expression other than polynomials. The DC voltage value may be predicted for a sampling time-point such as a two-period subsequent or 1.5-period subsequent time-point. The DC voltage-value estimation unit may be any kind of unit if it can predict the DC voltage value at a predetermined time after the latest sampling time-point by storing DC voltage measurement values at predetermined sampling time-points going back from the latest, and by using all or part of the stored DC voltage measurement values.

A voltage estimate value $E_{n+1}$ predicted by the DC voltage-value estimation unit 52 for a next sampling time-point is inputted into a voltage beat detection unit 53, so that the ripple component Vbeat is extracted thereby. The voltage beat detection unit 53 has a first-order delay filter with a predetermined time constant (referred to as T1), and extracts as a ripple component a component in which an output of the first-order delay filter is substituted from the voltage estimate value. Namely, the following equation is given, where parameter "s" stands for a differential operator.

$$Vbeat = E_{n+1} - E_{n+1}/(1 + T1 \times s) \quad (13)$$
$$= ((T1 \times s)/(1 + T1 \times s)) \times E_{n+1}$$

The time constant T1 of the first-order delay filter is set at least ten times as large as the sampling period T, preferably the value at least 100 times as large as that. When T=250 microseconds for example, it is suitable that T1=0.0025 second or larger, preferably T1=0.025 second or larger.

In an angular frequency control-value calculation unit 54, an angular frequency control-value ωheat is calculated by the following equation using a predetermined gain (=K) that is appropriately determined so that a frequency of AC voltages that the inverter 3 outputs becomes smaller when a ripple component Vbeat is larger, and the frequency becomes larger when the ripple component Vbeat is smaller.

$$\omega heat = K \times Vbeat \quad (14)$$

When an induction machine is subjected to vector control, voltages and currents in a d-q coordinate system that rotate coincident with the rotating magnetic flux are determined as follows. The d-axis is an axis that is coincident with an orientation of the secondary magnetic-flux, the q-axis is an axis that is perpendicular to the d-axis. The vector control is similar to that conventionally performed, so that only its general outline will be explained.

As variables that denote voltage, current and the like, the following variables are defined.

ωs*: a slip angular-frequency instruction-value

ω: a rotation angular frequency of the AC rotating machine 4 measured by the rotation sensor 7

ωinv: an angular frequency of AC voltages that the inverter 3 outputs

θ: a phase of the d-axis in a fixed coordinate system

Vd*: a d-axis voltage instruction-value to be outputted from the inverter 3

Vq*: a q-axis voltage instruction-value to be outputted from the inverter 3

Id*: a d-axis current instruction-value to be outputted from the inverter 3, proportional to a secondary magnetic-flux instruction-value Iq*: a q-axis current instruction-value to be outputted from the inverter 3, proportional to a torque instruction-value In addition, the following parameters are defined as machine constants of the induction machine.

Rs: a primary resistance value of the induction machine

Rr: a secondary resistance value of the induction machine

Ls: a primary inductance value of the induction machine

Lr: a secondary inductance value of the induction machine

M: a mutual inductance of the induction machine

σ: a leakage coefficient of the induction machine, $\sigma = 1 - (M^2/(Ls \times Lr))$ In the vector control, a slip angular-frequency instruction-value ωs* for an induction machine is given as follows:

$$\omega s^* = (Iq^* \times Rr)/(Id^* \times Lr) \quad (15)$$

An angular frequency ωinv of the AC voltages that the inverter 3 outputs, is given by the following equation. Note that, the term ωbeat is omitted when no consideration is taken into account to curb the beat phenomenon.

$$\omega inv = \omega + \omega s^* + \omega beat \quad (16)$$

Equation (14) and Equation (16) mean that an angular frequency ωinv of the AC voltages that the inverter 3 outputs becomes larger when a voltage Vbeat of ripple component is larger, and the angular frequency ωinv becomes smaller when the voltage Vbeat is smaller. According to the control as described above, a difference in power becomes smaller between a positive half-cycle and a negative half-cycle of the AC power, so that the beat phenomenon can be curbed.

By integrating the angular frequency ωinv, a d-axis phase θ is calculated by the following equation:

$$\theta = \int \omega invdt \tag{17}$$

The d-axis and q-axis voltages are given by the following equations:

$$Vd^* = Rs \times Id^* - \sigma \times \omega inv \times Ls \times Iq^* \tag{18}$$

$$Vq^* = Rs \times Iq^* + \omega inv \times Ls \times Id^* \tag{19}$$

An angular frequency control-value ωbeat is inputted into the frequency control unit 55, so that Equation (15) through Equation (17) are calculated. A voltage control unit 56 calculates Equation (18) and Equation (19). The d-axis phase θ, and the d-axis and q-axis voltage instruction-values Vd* and Vq* are inputted into the pulse generating unit 57, which generates gate pulses to be applied to the gates of switching elements, so that the AC voltages that the inverter 3 outputs are coincident with these instruction values.

Figure 5:
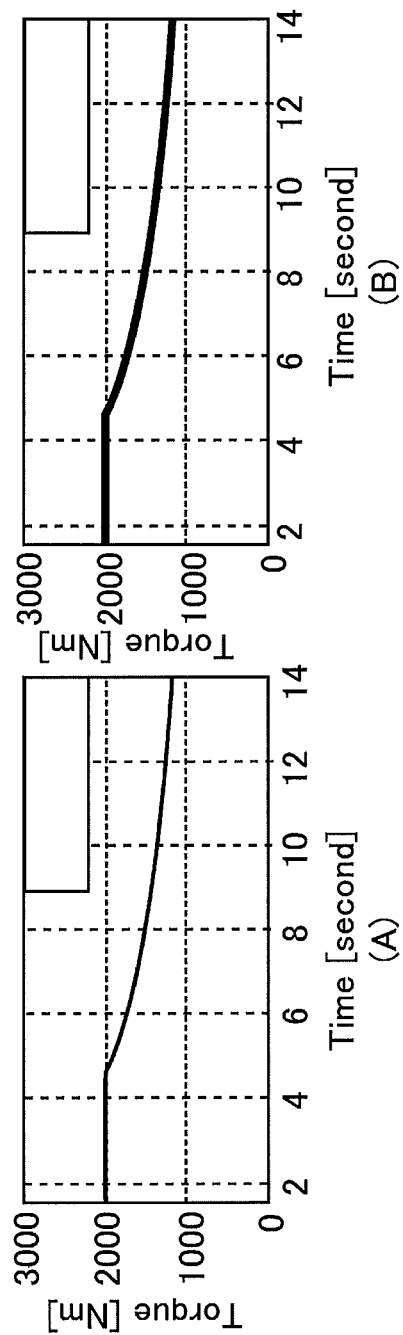
FIG. 5 includes diagrams for explaining variations of torque of an AC rotating machine in the electrical power conversion apparatus according to Embodiment 1 of the present invention, in cases when a control to curb a beat phenomenon is performed, and when it is not performed.

When the control is performed to curb such a beat phenomenon, its effect is confirmed by simulation. In FIG. 5, the diagrams show for explaining variations of torque of an AC rotating machine in the electrical power conversion apparatus according to Embodiment 1, in cases when the control to curb a beat phenomenon is performed, and when it is not performed. FIG. 5 (A) is a case in which the control according to the present invention is performed, and FIG. 5 (B) is a case in which the control according to the present invention is not performed. From FIG. 5, it can be understood that the beat phenomenon is suppressed using the present invention.

The simulation conditions are as follows: the capacity of an induction machine for an electric train is 200 kW; the maximum torque, 2000 Nm, the mean value of a DC voltage, 1500 V; the amplitude of ripple component, 30 V assuming the ripple component is two percent; and the frequency of an AC power source, 60 Hz, resulting that the frequency of the ripple component becomes 120 Hz.

As described above, a DC voltage value is predicted for a next sampling time-point, and the control is performed on the basis of the predicted DC voltage value, so that there exists an effect that the control to curb the beat phenomenon can be performed with no delay due to detection of a ripple component and its calculation processing. In addition, a band-pass filter is not used, so that such an effect is achieved that the apparatus can be easily adapted also for a case in which the power source frequency changes.

Although the beat suppression unit operates on the frequency control unit so as to curb the beat phenomenon, the beat suppression unit may operate on the voltage control unit. Although a configuration may become complex, it is possible to adopt a configuration in which the beat suppression unit operates on both of the frequency control unit and the voltage control unit.

The above descriptions holds true also in other embodiments.

Embodiment 2

Figure 6:
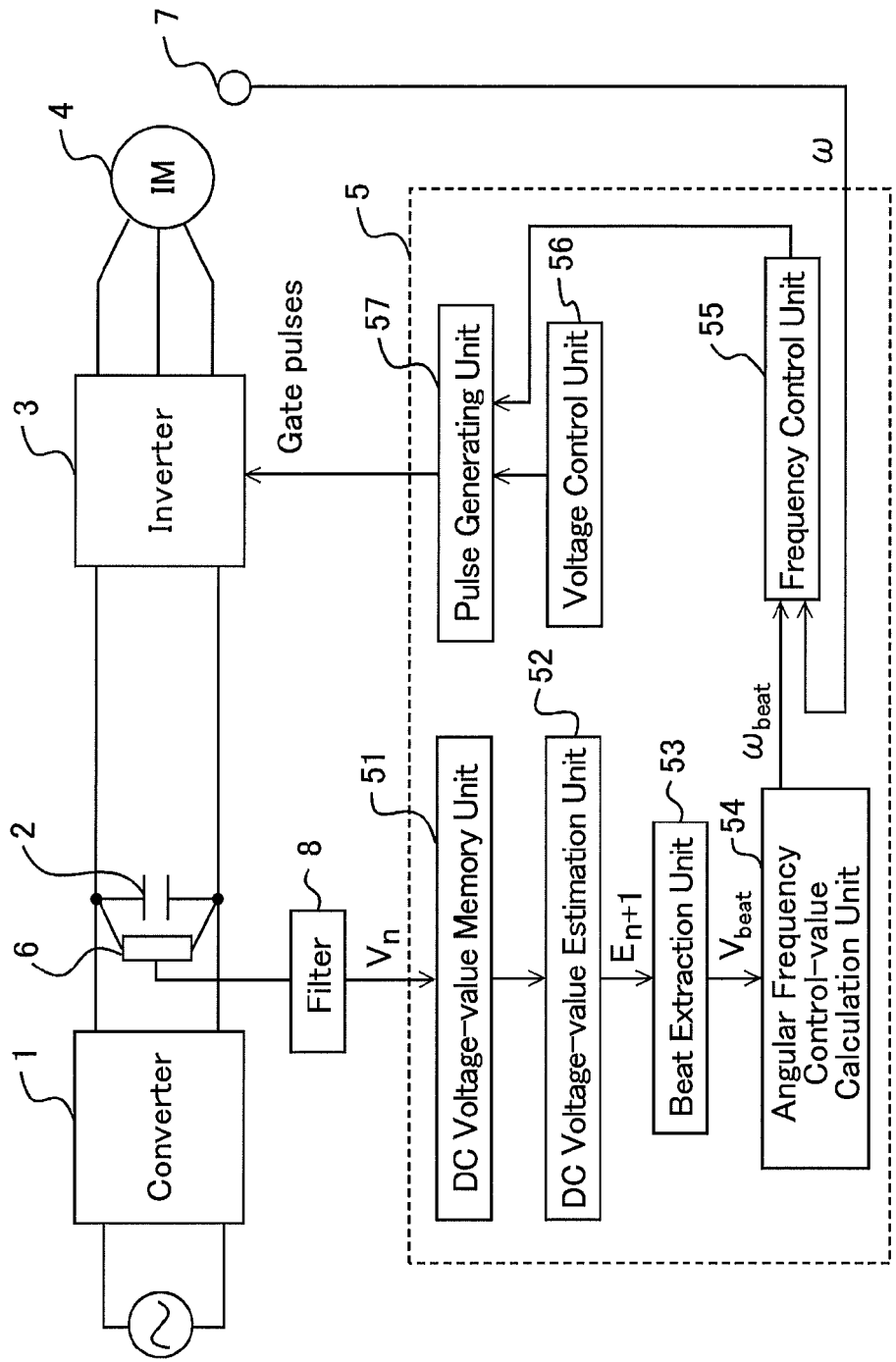
FIG. 6 is a block diagram illustrating a configuration example of another electrical power conversion apparatus according to Embodiment 2 of the present invention.

There arises a case in which switching noise generated by switching elements that the converter 1 and the inverter 3 have is included in a voltage across the capacitor 2 measured by the voltage detection unit 6. A case is also conceivable in which noise other than the switching noise is included. Embodiment 2 is a case in which high-frequency components that can be determined as noise are removed from the voltage, which is then stored as a DC voltage measurement value. A diagram shown in FIG. 6 is for explaining a configuration of another electrical power conversion apparatus according to Embodiment 2.

Only different points to FIG. 1 that is the case of Embodiment 1 will be explained. An output from the voltage detection unit 6 is inputted into a control device 5 through a filter 8. The filter 8 is a first-order delay filter with a time constant 72. A frequency that is a reciprocal number of the time constant 12 is set lower than the order of a switching frequency (here, 1000 Hz) of the inverter 3, and sufficiently higher than a frequency of a ripple component of DC voltage so that the ripple component can also be inputted into the control device 5. In place of the first-order delay filter, a high-frequency removal filter may be used. A filter of any kind can be used if it can remove a signal whose frequency is sufficiently higher than that in the ripple component of DC voltage.

In Embodiment 2, the operations are also similar to the manner in Embodiment 1. A DC voltage value is predicted for a next sampling time-point, and the control is performed on the basis of the predicted DC voltage value, so that there exists an effect that the control to curb the beat phenomenon can be performed with no delay due to detection of a ripple component and its calculation processing. In addition, a band-pass filter is not used, so that such an effect is achieved that the apparatus can be easily adapted also for a case in which the power source frequency changes. Moreover, because the estimation is performed on the basis of measurement values of the DC voltage in which noise caused by the switching or the like is removed, estimation accuracy for the DC voltage is also enhanced.

The above descriptions holds true also in other embodiments.

Embodiment 3

Figure 7:
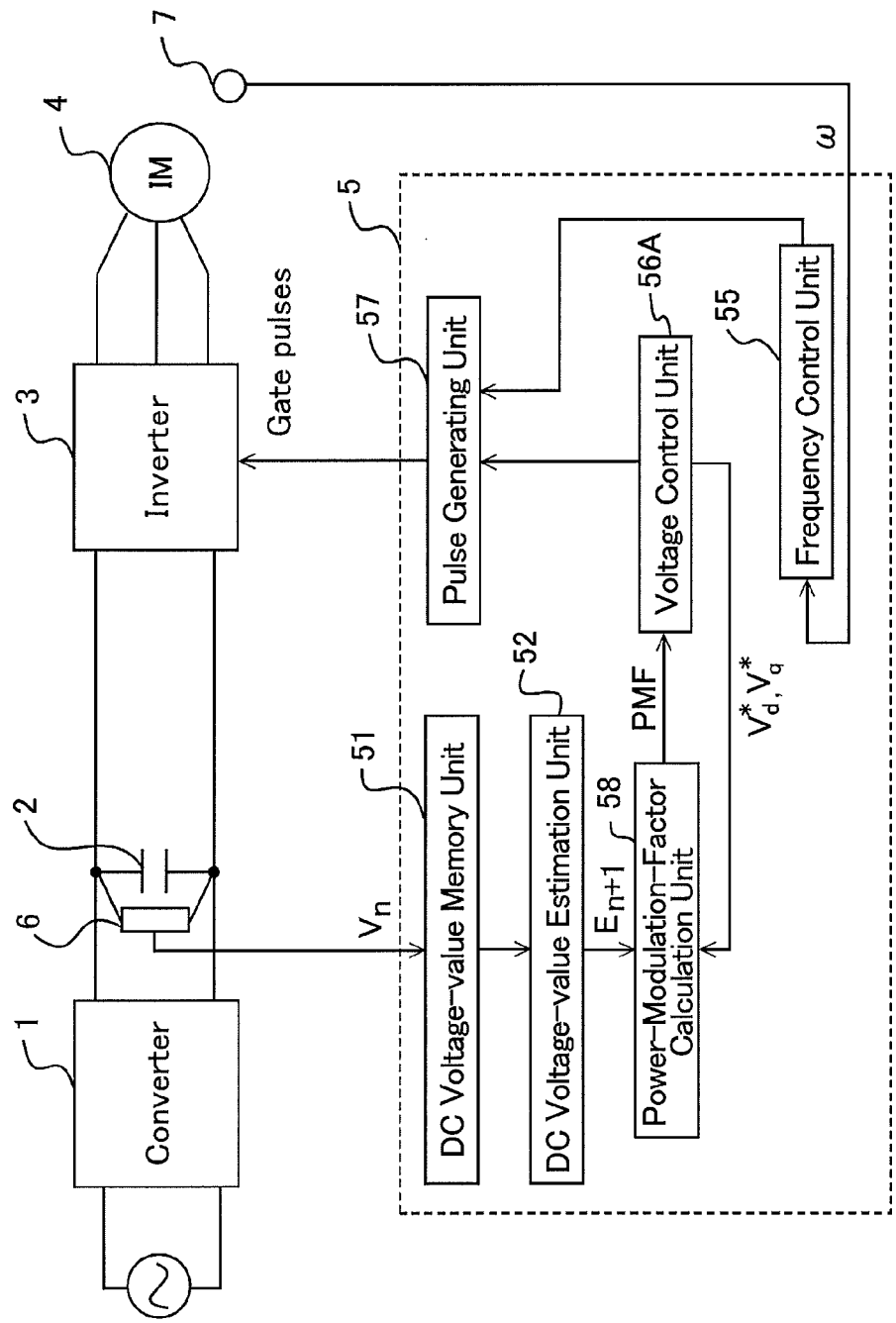
FIG. 7 is a block diagram illustrating a configuration example of another electrical power conversion apparatus according to Embodiment 3 of the present invention.

Embodiment 3 is a case in which a beat suppression unit operates on a voltage control unit to curb the beat phenomenon. A diagram shown in FIG. 7 is for explaining a configuration of another electrical power conversion apparatus according to Embodiment 3.

Only different points to FIG. 1 that is the case of Embodiment 1 will be explained. The beat extraction unit 53 and the angular frequency control-value calculation unit 54 are omitted, and a power-modulation-factor calculation unit 58 that is the beat suppression unit is added. The power-modulation-factor calculation unit 58 calculates a power modulation factor so that the factor is inversely proportional to a voltage estimate value $E_{n+1}$ estimated for a next sampling time-point by the DC voltage-value estimation unit 52. The power modulation factor calculated by the power-modulation-factor calculation unit 58 is inputted into the voltage control unit 56A.

Next, the operations will be explained. The DC voltage-value estimation unit 52 predicts a voltage estimate value $E_{n+1}$ for a next sampling time-point using Equation (9). The slip angular-frequency instruction-value ωs* of the induction machine is given by Equation (15). An angular frequency ωinv of AC voltages that the inverter 3 outputs, is given by the following equation:

$$\omega inv = \omega + \omega s^* \tag{20}$$

The d-axis phase θ is calculated by Equation (17). The d-axis and q-axis voltages are calculated by Equation (18) by Equation (19).

In the power-modulation-factor calculation unit 58, a power modulation factor PMF is calculated using the following equation:

$$PMF = \sqrt{(Vd^{*2} + Vq^{*2})}/((\sqrt{6}/\pi) \times E_{n+1}) \quad (21)$$

When the power modulation factor PMF is calculated using Equation (21), the larger the DC voltage estimate value $E_{n+1}$ is, the smaller the power modulation factor PMF becomes, whereas the smaller the DC voltage estimate value $E_{n+1}$, the larger the power modulation factor PMF becomes. When the DC voltage estimate value varies, the AC power generated by the inverter does not vary at all in theory, and even if it varies, the magnitude of the variation becomes smaller. For this reason, the beat phenomenon can be curbed.

Voltage instruction-value vectors (Vd*, Vq*) are multiplied by the power modulation factor PMF, so that the following three-phase voltage instruction-values (Vu*, Vv*, Vw*) are given:

$$Vu^* = PMF \times \cos(\theta v) \quad (22)$$

$$Vv^* = PMF \times \cos(\theta v - (2/3)\pi) \quad (23)$$

$$Vw^* = PMF \times \cos(\theta v + (2/3)\pi) \quad (24)$$

Here, a variable $\theta v$ is a phase of the voltage instruction-value vectors, leading to a small extent with respect to the d-axis, and can be calculated by the following equation:

$$\theta v = \theta + \arctan(Vq^*/Vd^*) \quad (25)$$

The pulse generating unit 57 generates gate pulses applied to the gates of switching elements so that the three-phase AC voltages that the inverter 3 outputs are coincident with the three-phase voltage instruction-values (Vu*, Vv*, Vw*) expressed by Equation (22) through Equation (24), respectively.

Also in the case in which the beat suppression unit operates on the voltage control unit, the DC voltage value is predicted for a next sampling time-point, and the control is performed on the basis of the predicted DC voltage value, so that there exists an effect the control to curb the beat phenomenon can be performed with no delay due to detection of a ripple component and its calculation processing. In addition, a band-pass filter is not used, so that such an effect is achieved that the apparatus can be easily adapted also for a case in which the power source frequency changes. Moreover, because the beat extraction unit is not necessary, the configuration of the control device becomes simpler.

Embodiment 4

Figure 8:
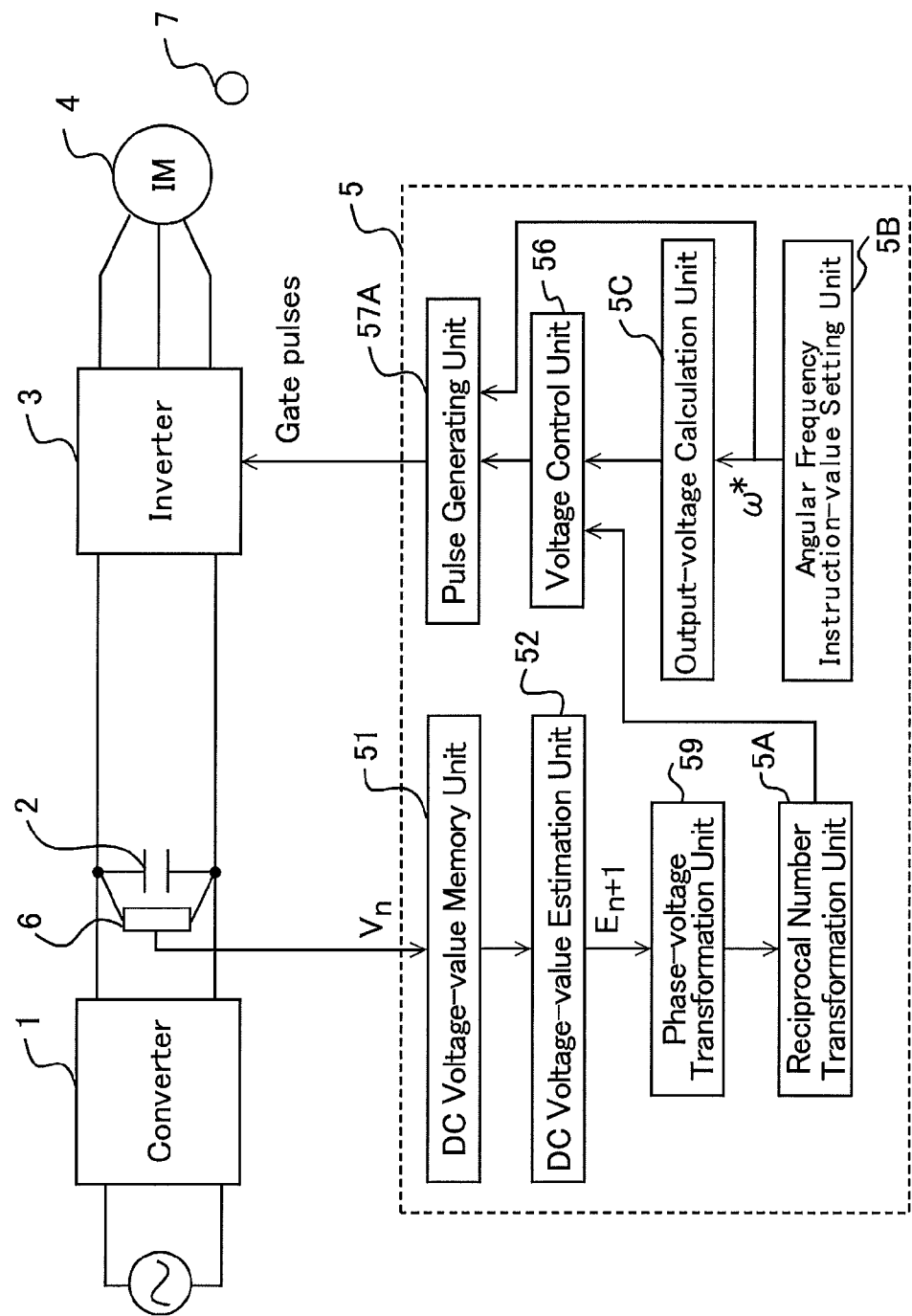
FIG. 8 is a block diagram illustrating a configuration example of another electrical power conversion apparatus according to Embodiment 4 of the present invention.

Embodiment 4 is a case in which a beat suppression unit operates on a voltage control unit to curb the beat phenomenon in a scheme of voltage/frequency ratio constant control in which the ratio of a voltage to its frequency is kept constant. A diagram shown in FIG. 8 is for explaining a configuration of another electrical power conversion apparatus according to Embodiment 4.

A control device 5 includes the DC voltage-value memory unit 51 and the DC voltage-value estimation unit 52 described above; a phase-voltage transformation unit 59 for transforming a DC voltage estimate value predicted by the DC voltage-value estimation unit 52 into a phase voltage; a reciprocal number transformation unit 5A for calculating a reciprocal number of the phase voltage outputted from the phase-voltage transformation unit 59; an angular frequency instruction-value setting unit 5B for setting an angular frequency instruction-value; an output-voltage calculation unit 5C for determining an output voltage from a frequency instruction-value; the voltage control unit 56B for defining as voltage amplitudes, products produced by multiplying the output from the reciprocal number transformation unit 5A by the voltage that the output-voltage calculation unit 5C outputs; and a pulse generating unit 57A into which the outputs from the voltage control unit 56B and the angular frequency instruction-value setting unit 5B are inputted, for outputting gate pulses to control the switching elements that the inverter 3 has. Note that, the phase-voltage transformation unit 59 and the reciprocal number transformation unit 5A constitute the beat suppression unit.

The operations will be explained. The DC voltage-value memory unit 51 and the DC voltage-value estimation unit 52 operate similarly to those in Embodiment 1. In the phase-voltage transformation unit 59, a voltage estimate value $E_{n+1}$ for a next sampling time-point is transformed to a phase voltage V1 using the following equation:

$$V1 = (2/\pi) \times E_{n+1} \quad (26)$$

In the reciprocal number transformation unit 5A, a value V2 that is the reciprocal number of V1 is calculated by the following equation. This equation enables suppressing variation of the AC power generated by the inverter similarly to Equation (21) in Embodiment 3, so that the beat phenomenon can be curbed.

$$V2 = 1/V1 \quad (27)$$

In the angular frequency instruction-value setting unit 5B, a frequency instruction-value being externally inputted is transformed to an angular frequency, so as to set an angular frequency instruction-value $\omega^*$. The angular frequency instruction-value $\omega^*$ is inputted into the output-voltage calculation unit 5C by which voltage instruction-value V* is calculated so that the ratio of the voltage to its frequency is made constant.

In the voltage control unit 56B, the instruction-value V* is multiplied by V2, and the products are outputted. In the pulse generating unit 57A, gate pulses to be applied to the gates of switching elements of the inverter 3 are controlled so that the inverter 3 outputs three-phase voltage instruction-values (Vu*, Vv*, Vw*) as follow.

$$Vu^* = (V^*/V1) \times \cos(\theta) \quad (28)$$

$$Vv^* = (V^*/V1) \times \cos(\theta - (2/3)\pi) \quad (29)$$

$$Vw^* = (V^*/V1) \times \cos(\theta + (2/3)\pi) \quad (30)$$

In the case in which the scheme of voltage/frequency ratio constant control is performed, the DC voltage value is predicted for a next sampling time-point, and the control is performed on the basis of the predicted DC voltage value, so that there exists an effect that the control to curb the beat phenomenon can be performed with no delay due to detection of a ripple component and its calculation processing. In addition, a band-pass filter is not used, so that such an effect is achieved that the apparatus can be easily adapted also for a case in which the power source frequency changes. Moreover, because the beat extraction unit is not necessary, the configuration of the control device becomes simpler.

Embodiment 5

Figure 9:
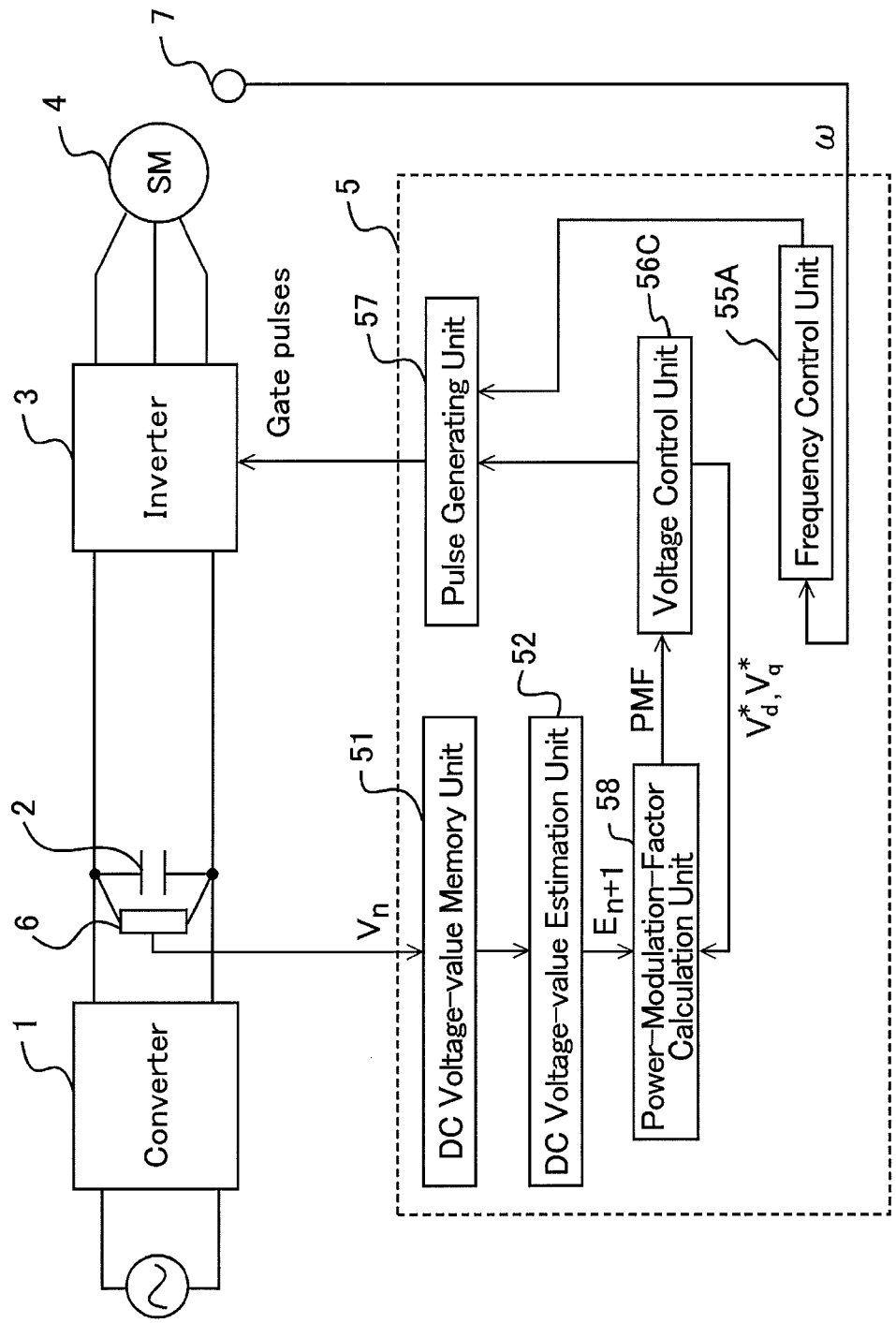
FIG. 9 is a block diagram illustrating a configuration example of another electrical power conversion apparatus according to Embodiment 5 of the present invention.

Embodiment 5 is a case in which Embodiment 3 is so modified as to apply to it a permanent-magnet synchronous machine. A diagram shown in FIG. 9 is for explaining a configuration of another electrical power conversion apparatus according to Embodiment 5.

Only different points to FIG. 7 that is the case of Embodiment 3 will be explained. An AC rotating machine 4A is the permanent-magnet synchronous machine. A frequency control unit 55A and a voltage control unit 56C perform a control corresponding to the synchronous machine. Relationships between the frequency control unit 55A and the voltage control unit 56C, and the other constituent elements are similar to the case in Embodiment 3.

The operations will be explained. The DC voltage-value memory unit 51 and the DC voltage-value estimation unit 52 operate similarly to those in Embodiment 1. In order to explain the operations of the voltage control unit 56C, the following parameters are defined as machine constants of the synchronous machine.

R: a resistance value of the synchronous machine
Ld: a d-axis inductance value of the synchronous machine
Lq: a q-axis inductance value of the synchronous machine Because an angular frequency wine of AC voltages that the inverter 3 outputs is coincident with a rotation angular frequency of the synchronous machine each other, the following equation is given. A d-axis phase θ is given by Equation (17).

$$\omega inv = \omega \tag{31}$$

The d-axis and q-axis voltages are given by the following equations, where "p" is a differential operator. The term with "p" may be omitted.

$$Vd^* = (R + Ld \times p) \times Id^* - \omega \times Lq \times Iq^* \tag{32}$$

$$Vq^* = (R + Ld \times p) \times Iq^* + \omega \times Lq \times Iq^* \tag{33}$$

In the power-modulation-factor calculation unit 58, a power modulation factor PMF is calculated from Vd* given by Equation (32) and Vq* given by Equation (33), using Equation (21) described above. The voltage instruction-value vectors (Vd*, Vq*) are multiplied by the power modulation factor PMF, so that three-phase voltage instruction-values (Vu*, Vv*, Vw*) calculated from Equation (22) through Equation (24) are obtained, respectively.

The pulse generating unit 57 generates gate pulses applied to the gates of switching elements that the inverter 3 has, so that the three-phase AC voltages that the inverter 3 outputs, are coincident with the three-phase voltage instruction-values (Vu*, Vv*, Vw*) expressed by Equation (22) through Equation (24), respectively.

In the case in which the synchronous machine is driven, the DC voltage value is predicted for a next sampling time-point, and the control is performed on the basis of the predicted DC voltage value, so that there exists an effect that the control to curb the beat phenomenon can be performed with no delay due to detection of a ripple component and its calculation processing. In addition, a band-pass filter is not used, so that such an effect is achieved that the apparatus can be easily adapted also for a case in which the power source frequency changes. Moreover, because the beat extraction unit is not necessary, the configuration of the control device becomes simpler.

Embodiment 6

Figure 10:
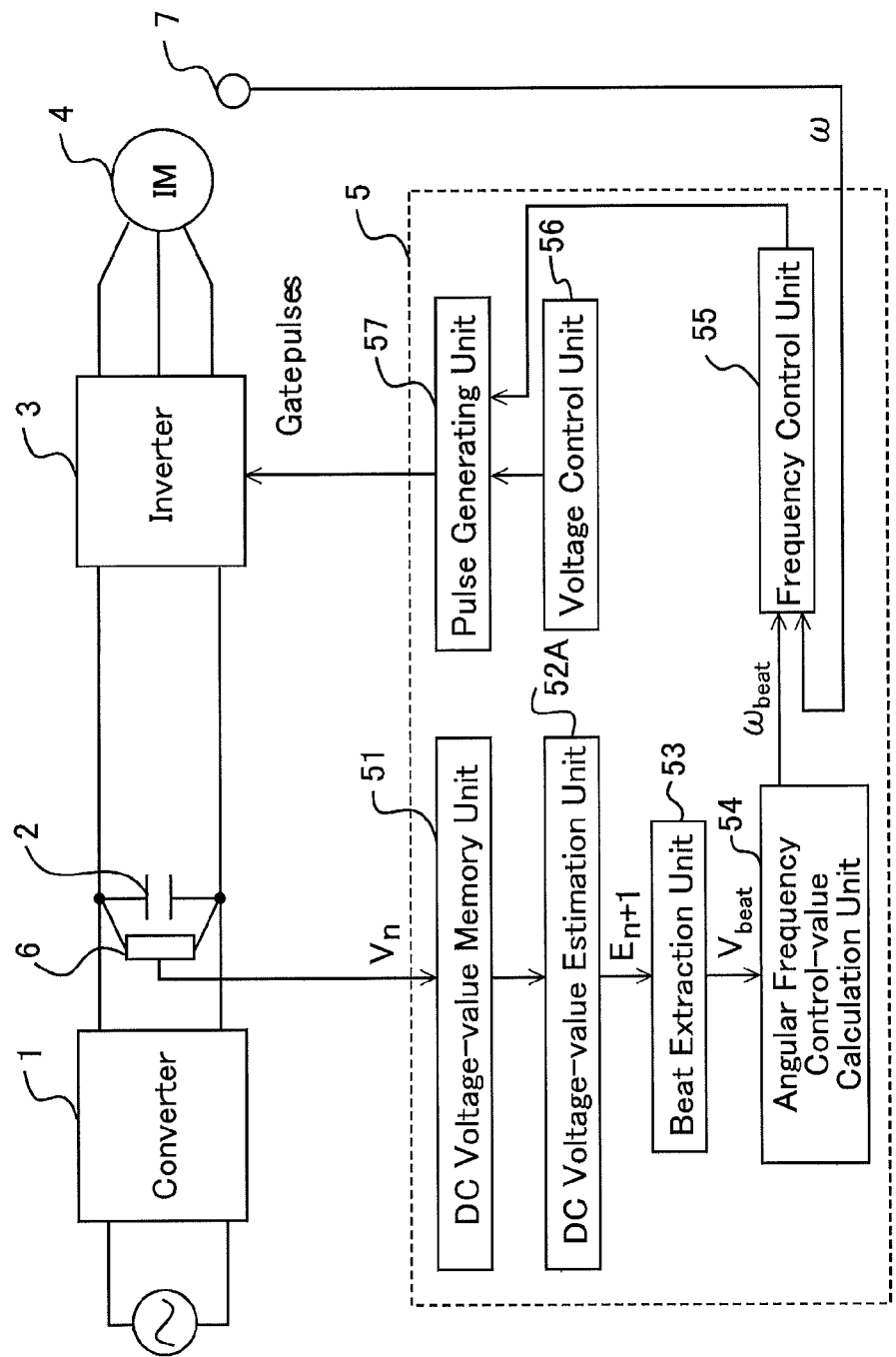
FIG. 10 is a block diagram illustrating a configuration example of another electrical power conversion apparatus according to Embodiment 6 of the present invention.

Embodiment 6 is a case in which a DC voltage-value estimation unit predicts a DC voltage at a time k sampling period after the latest sampling time-point. Given that parameter "k" is set at an appropriate value that is larger than one, it is possible to realize the compensation that includes a control delay in the inverter. A diagram shown in FIG. 10 is for explaining a configuration of another electrical power conversion apparatus according to Embodiment 6. Only different points to FIG. 1 that is the case of Embodiment 1 will be explained. The DC voltage-value estimation unit 52A is provided for predicting a DC voltage at the time k sampling period after the latest sampling time-point. The output from the DC voltage-value estimation unit 52A is inputted into the beat extraction unit 53.

The operations will be explained. Here, the following variable is additionally defined.

Figure 11:
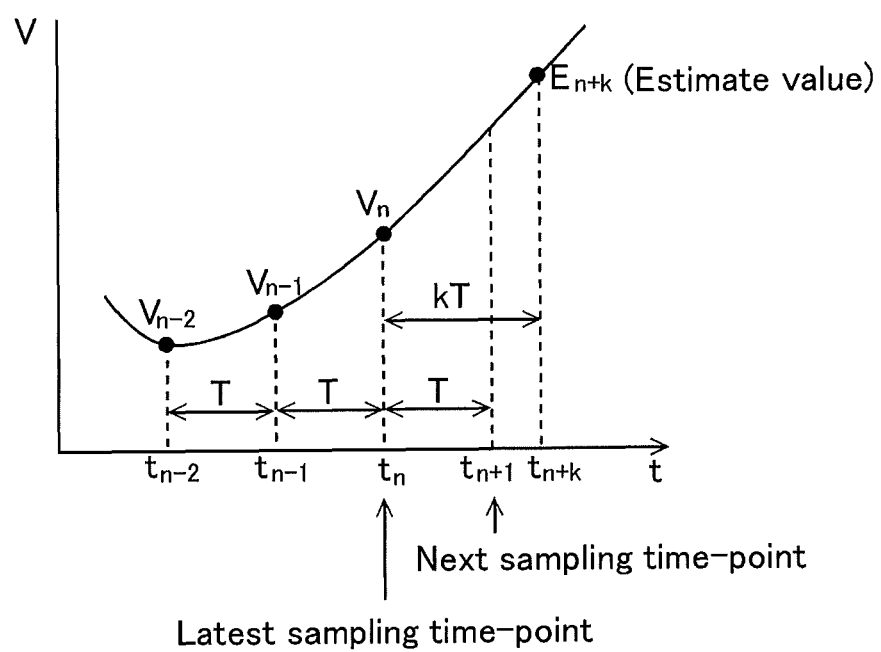
FIG. 11 is a diagram for explaining a concept of voltage estimation according to Embodiment 6 of the present invention.

$E_{n+k}$: a voltage estimate value at a time k sampling period after the latest sampling time-point A diagram shown in FIG. 11 is for explaining a concept of voltage estimation according to Embodiment 6 of the present invention. Based on three voltage measurement values $V_n$, and $V_{n-1}$ and $V_{n-2}$ going back from the latest, a polynomial is obtained that expresses the voltages indicated by the solid-line curve as a function of time. By inputting the time at the time k sampling period after the latest sampling time-point into the obtained polynomial, a voltage estimate value $E_{n+k}$ is calculated for the time point k period after the latest sampling time-point.

A second-order approximation polynomial for a DC voltage value is assumed as Equation (1) described above. In relation to voltage measurement values at three sampling time-points going back from the latest, Equation (2) through Equation (4) are held. By calculating a voltage estimate value $E_{n+k}$ from Equation (1), the following equation is given:

$$E_{n+k} = a \times (k \times T)^2 + b \times k \times T + c \tag{34}$$

By eliminating the coefficients a, b and c from Equation (2) through Equation (4), and Equation (34), the following equation is derived:

$$E_{n+k} = ((k^2 + 3 \times k + 2)/2) \times V_n - (k^2 + 2 \times k) \times V_{n-1} + ((k^2 + k)/2) \tag{35}$$

By setting k=1.5, the following equation is given from Equation (35).

$$E_{n+1.5} = (35/8) \times V_n - (21/4) \times V_{n-1} + (15/8) \times V_{n-2} \tag{36}$$

A voltage estimate value $E_{n+k}$ at a time k sampling period after the latest sampling time-point that the DC voltage-value estimation unit 52A predicts is inputted into the voltage beat detection unit 53, so that a ripple component Vbeat is extracted in a similar manner to the case in Embodiment 1. An equation for the extraction is given by substituting $E_{n+1}$ for $E_{n+k}$ in Equation (13). The subsequent operations are similar to those in Embodiment 1.

As described above, the DC voltage value is predicted at a predetermined time (here, k periods) to be elapsed after the latest sampling time-point, and the control is performed on the basis of the predicted DC voltage value, so that there exists an effect that the control to curb the beat phenomenon can be performed with no delay due to detection of a ripple component and its calculation processing, and moreover, further compensating a control delay in the inverter. In addition, a band-pass filter is not used, so that such an effect is achieved that the apparatus can be easily adapted also for a case in which the power source frequency changes.

The predetermined time is not limited to k=1.5, eventually "k" can be determined as an appropriate value by actually applying it on a trial basis so that a better control result is obtained. In addition, it is possible to adapt that the extrapolation is realized using an approximate expression of third-order or higher. Although the details of derivation will be omitted, the following equation is given when a DC voltage value at a time k sampling periods after the latest sampling time-point is predicted by extrapolating a third-order approximation polynomial based on voltage measurement values at four sampling time-points going back from the latest.

$$E_{n+k} = ((k^3 + 6 \times k^2 - 5 \times k + 6)/6) \times V_n - \qquad (37)$$
$$((k^3 + 5 \times k^2 - 6 \times k)/2) \times V_{n-1} +$$
$$((k^3 + 4 \times k^2 - 3 \times k)/2) \times V_{n-2} - ((k^3 + 3 \times k^2 - 2 \times k)/6) \times V_{n-3}$$

Similarly, the following equation is given when a fourth-order approximation polynomial is used.

$$E_{n+k} = ((k^3 + 6 \times k^2 - 5 \times k + 6)/6) \times V_n - \qquad (38)$$
$$((k^4 + 9 \times k^3 + 26 \times k^2 + 12 \times k)/6) \times V_{n-1} +$$
$$((k^4 + 8 \times k^3 + 19 \times k^2 + 12 \times k)/4) \times V_{n-2} -$$
$$((k^4 + 7 \times k^3 + 14 \times k^2 + 8 \times k)/6) \times V_{n-3} +$$
$$((k^4 + 6 \times k^3 + 11 \times k^2 + 6 \times k)/24) \times V_{n-4}$$

The following equation is given when Equation (37) is used by setting k=1.5.

$$E_{n+1.5} = \qquad (39)$$
$$(27/16) \times V_n - (45/16) \times V_{n-1} + (63/16) \times V_{n-2} + (19/16) \times V_{n-3}$$

The following equation is given when Equation (38) is used.

$$E_{n+1.5} = (555/128) \times V_n - (597/32) \times V_{n-1} + \qquad (40)$$
$$(1485/64) \times V_{n-2} - (385/32) \times V_{n-3} + (315/128) \times V_{n-4}$$

In order to avoid an influence caused by noise or the like, it is possible to configure the apparatus so that a voltage across the capacitor 2 measured by the voltage detection unit 6 is passed through a filter that removes high-frequency components from the voltage, which is stored and then used in the DC voltage-value estimation unit. In place of using the filter, it is possible to configure the apparatus so that the number of measurement values of the DC voltage is increased, and polynomial approximation in which square errors become minimum is obtained and used for the estimation. In addition, a DC voltage may be predicted at a predetermined time (here, a k period) to be elapsed after the latest sampling time-point using polynomial approximation obtained in units of predetermined times of sampling periods (for example, two times).

Note that, although cases in which an AC rotating machine is used as a load connected to the electrical power conversion apparatus are described in Embodiment 1 through Embodiment 6 of the present invention, the AC rotating machine is not limited to an induction machine or a synchronous machine, similar effects can be expected for any kind of AC rotating machine.

Moreover, similar effects can be expected, when the inversion is applied to an electrical power conversion apparatus for controlling an electromagnetic actuator such as a linear induction motor, a linear synchronous motor, a solenoid or the like, other than such AC rotating machines.

Each of the configurations described in the embodiments above is an example of the contents of the present invention, thus it is possible to realize the present invention by combining with other publicly known techniques, and also to configure it with modification such as omitting some portions without departing from the gist of the present invention.

INDUSTRIAL APPLICABILITY

The present invention is an electrical power conversion apparatus to drive an AC rotating machine at a variable speed using as a power source direct current obtained by rectifying an AC power source using a converter. The apparatus is presumed to be applied particularly to an electric train that is for an AC electric railroad. Moreover, the apparatus is also applicable to air-conditioning devices used for electric trains, and to household electric appliances in which a motor is controlled by an inverter, such as air conditioners, refrigerators, and washing machines.

What is claimed is:

1. An electrical power conversion apparatus for an electric railroad car, comprising:
    a converter for converting AC power produced between a line and a rail into DC power;
    a capacitor connected in parallel with the converter on the DC side thereof;
    a DC voltage measurement unit for measuring a voltage across the capacitor;
    an inverter including switching elements, connected in parallel with the capacitor, for converting DC power into AC power of an arbitrary frequency; and
    a control microprocessor into which DC voltage values each measured by the DC voltage measurement unit are inputted in a predetermined sampling period, for controlling the inverter, wherein
    the control microprocessor includes
       a voltage control unit for controlling a voltage amplitude of the AC power that the inverter outputs;
       a frequency control unit for controlling the frequency of the AC power that the inverter outputs;
       a DC voltage-value memory unit for storing the DC voltage values at predetermined sampling time-points going back from the latest;
       a DC voltage-value estimation unit for predicting a DC voltage estimate value at a predetermined time after a next sampling time-point using the DC voltage values at the predetermined sampling time-points going back from the latest, stored in the DC voltage-value memory unit; and
       a beat suppression unit into which the DC voltage estimate value predicted by the DC voltage-value estimation unit is inputted, for operating on either one or both of the voltage control unit and the frequency control unit so as to curb variation of the AC power that the inverter outputs, due to a ripple caused on the DC side of the inverter, and wherein
    the DC voltage-value estimation unit obtains a predetermined-order polynomial that approximates the DC voltage values stored in the DC voltage-value memory unit, and, using the polynomial, predicts a DC voltage estimate value at a predetermined time after the latest sampling time-point, and
    the beat suppression unit operates on the frequency control unit so that the frequency becomes smaller when the DC voltage estimate value predicted by the DC voltage-value estimation unit becomes larger, and the frequency becomes larger when the DC voltage estimate value becomes smaller.

2. An electrical power conversion apparatus for an electric railroad car, comprising:
- a converter for converting AC power produced between a line and a rail into DC power;
- a capacitor connected in parallel with the converter on the DC side thereof;
- a DC voltage measurement unit for measuring a voltage across the capacitor;
- an inverter including switching elements, connected in parallel with the capacitor, for converting DC power into AC power of an arbitrary frequency; and
- a control microprocessor into which DC voltage values each measured by the DC voltage measurement unit are inputted in a predetermined sampling period, for controlling the inverter, wherein the control microprocessor includes
- a voltage control unit for controlling a voltage amplitude of the AC power that the inverter outputs;
- a frequency control unit for controlling the frequency of the AC power that the inverter outputs;
- a DC voltage-value memory unit for storing the DC voltage values at predetermined sampling time-points going back from the latest;
- a DC voltage-value estimation unit for predicting a DC voltage estimate value at a predetermined time after a next sampling time-point using the DC voltage values at the predetermined sampling time-points going back from the latest, stored in the DC voltage-value memory unit; and
- a beat suppression unit into which the DC voltage estimate value predicted by the DC voltage-value estimation unit is inputted, for operating on either one or both of the voltage control unit and the frequency control unit so as to curb variation of the AC power that the inverter outputs, due to a ripple caused on the DC side of the inverter, and wherein the DC voltage-value estimation unit obtains a predetermined-order polynomial that approximates the DC voltage values stored in the DC voltage-value memory unit, and, using the polynomial, predicts a DC voltage estimate value at a predetermined time after the latest sampling time-point, and the beat suppression unit operates on the voltage control unit so that the voltage amplitude becomes smaller when the DC voltage estimate value predicted by the DC voltage-value estimation unit becomes larger, and the voltage amplitude becomes larger when the DC voltage estimate value becomes smaller.

3. An electrical power conversion apparatus for an electric railroad car, comprising:
- a converter for converting AC power produced between a line and a rail into DC power;
- a capacitor connected in parallel with the converter on the DC side thereof;
- a DC voltage measurement unit for measuring a voltage across the capacitor;
- an inverter including switching elements, connected in parallel with the capacitor, for converting DC power into AC power of an arbitrary frequency; and
- a control microprocessor into which DC voltage values each measured by the DC voltage measurement unit are inputted in a predetermined sampling period, for controlling the inverter, wherein the control microprocessor includes
- a voltage control unit for controlling a voltage amplitude of the AC power that the inverter outputs;
- a frequency control unit for controlling the frequency of the AC power that the inverter outputs;
- a DC voltage-value memory unit for storing the DC voltage values at predetermined sampling time-points going back from the latest;
- a DC voltage-value estimation unit for predicting a DC voltage estimate value at a predetermined time after a next sampling time-point using the DC voltage values at the predetermined sampling time-points going back from the latest, stored in the DC voltage-value memory unit; and
- a beat suppression unit into which the DC voltage estimate value predicted by the DC voltage-value estimation unit is inputted, for operating on either one or both of the voltage control unit and the frequency control unit so as to curb variation of the AC power that the inverter outputs, due to a ripple caused on the DC side of the inverter, and wherein the DC voltage-value estimation unit obtains a predetermined-order polynomial that approximates the DC voltage values stored in the DC voltage-value memory unit, and, using the polynomial, predicts a DC voltage estimate value at a predetermined time after the latest sampling time-point, and the DC voltage-value estimation unit predicts a DC voltage estimate value $E^{n+k}$ at a time k sampling periods after the latest sampling time-point using the following equation, based on a DC voltage value $V_n$ measured at the latest sampling time-point by the DC voltage measurement unit, and on a DC voltage value $V_{n-1}$ at a one-period previous sampling time-point and a DC voltage value $V_{n-2}$ at a two-period previous sampling time-point stored in the DC voltage-value memory unit:

$$E_{n+k} = ((k^2 + 3 \times k + 2)/2) \times V_n - (k^2 + 2 \times k) \times V_{n-1} + ((k^2 + k)/2) \times V_{n-2}.$$

4. An electrical power conversion apparatus for an electric railroad car, comprising:
- a converter for converting AC power produced between a line and a rail into DC power;
- a capacitor connected in parallel with the converter on the DC side thereof;
- a DC voltage measurement unit for measuring a voltage across the capacitor;
- an inverter including switching elements, connected in parallel with the capacitor, for converting DC power into AC power of an arbitrary frequency; and
- a control microprocessor into which DC voltage values each measured by the DC voltage measurement unit are inputted in a predetermined sampling period, for controlling the inverter, wherein the control microprocessor includes
- a voltage control unit for controlling a voltage amplitude of the AC power that the inverter outputs;
- a frequency control unit for controlling the frequency of the AC power that the inverter outputs;
- a DC voltage-value memory unit for storing the DC voltage values at predetermined sampling time-points going back from the latest;
- a DC voltage-value estimation unit for predicting a DC voltage estimate value at a predetermined time after a next sampling time-point using the DC voltage values at the predetermined sampling time-points going back from the latest, stored in the DC voltage-value memory unit; and a beat suppression unit into which the DC voltage estimate value predicted by the DC voltage-value estimation unit is inputted, for operating on either one or both of the voltage control unit and the frequency control unit so as to curb variation of the AC power that the inverter outputs, due to a ripple caused on the DC side of the inverter, and wherein the DC voltage-value estimation unit obtains a predetermined-order polynomial that approximates the DC voltage values stored in the DC voltage-value memory unit, and, using the polynomial, predicts a DC voltage estimate value at a predetermined time after the latest sampling time-point, and the DC voltage-value estimation unit predicts a DC voltage estimate value $E_{n+k}$ at a time k sampling periods after the latest sampling time-point using the following equation, based on a DC voltage value $V_n$ measured at the latest sampling time-point by the DC voltage measurement unit, and on a DC voltage value $V_{n-1}$ at a one-period previous sampling time-point, a DC voltage value $V_{n-2}$ at a two-period previous sampling time-point and a DC voltage value $V_{n-3}$ at a three-period previous sampling time-point stored in the DC voltage-value memory unit:

$$E_{n+k} = ((k^3 + 6 \times k^2 - 5 \times k + 6)/6) \times V_n - ((k^3 + 5 \times k^2 - 6 \times k)/2) \times V_{n-1} + ((k^3 + 4 \times k^2 - 3 \times k)/2) \times V_{n-2} - ((k^3 + 3 \times k^2 - 2 \times k)/6) \times V_{n-3}.$$

5. An electrical power conversion apparatus for an electric railroad car, comprising:
   a converter for converting AC power produced between a line and a rail into DC power;
   a capacitor connected in parallel with the converter on the DC side thereof;
   a DC voltage measurement unit for measuring a voltage across the capacitor;
   an inverter including switching elements, connected in parallel with the capacitor, for converting DC power into AC power of an arbitrary frequency; and
   a control microprocessor into which DC voltage values each measured by the DC voltage measurement unit are inputted in a predetermined sampling period, for controlling the inverter, wherein
   the control microprocessor includes
      a voltage control unit for controlling a voltage amplitude of the AC power that the inverter outputs;
      a frequency control unit for controlling the frequency of the AC power that the inverter outputs;
      a DC voltage-value memory unit for storing the DC voltage values at predetermined sampling time-points going back from the latest;
      a DC voltage-value estimation unit for predicting a DC voltage estimate value at a predetermined time after a next sampling time-point using the DC voltage values at the predetermined sampling time-points going back from the latest, stored in the DC voltage-value memory unit; and
      a beat suppression unit into which the DC voltage estimate value predicted by the DC voltage-value estimation unit is inputted, for operating on either one or both of the voltage control unit and the frequency control unit so as to curb variation of the AC power that the inverter outputs, due to a ripple caused on the DC side of the inverter, and wherein
   the DC voltage-value estimation unit obtains a predetermined-order polynomial that approximates the DC voltage values stored in the DC voltage-value memory unit, and, using the polynomial, predicts a DC voltage estimate value at a predetermined time after the latest sampling time-point, and
   the DC voltage-value estimation unit predicts a DC voltage estimate value $E_{n+k}$ at a time k sampling periods after the latest sampling time-point using the following equation, based on a DC voltage value $V_n$ measured at the latest sampling time-point by the DC voltage measurement unit, and on a DC voltage value $V_{n-1}$ at a one-period previous sampling time-point, a DC voltage value $V_{n-2}$ at a two-period previous sampling time-point, a DC voltage value $V_{n-3}$ at a three-period previous sampling time-point and a DC voltage value $V_{n-4}$ at a four-period previous sampling time-point stored in the DC voltage-value memory unit:

$$E_{n+k} = ((k^3 + 6 \times k^2 - 5 \times k + 6)/6) \times V_n - \\ ((k^4 + 9 \times k^3 + 26 \times k^2 + 12 \times k)/6) \times V_{n-1} + \\ ((k^4 + 8 \times k^3 + 19 \times k^2 + 12 \times k)/4) \times V_{n-2} - \\ ((k^4 + 7 \times k^3 + 14 \times k^2 + 8 \times k)/6) \times V_{n-3} + \\ ((k^4 + 6 \times k^3 + 11 \times k^2 + 6 \times k)/24) \times V_{n-4}.$$

* * * * *